(12) United States Patent
Torres et al.

(10) Patent No.: US 11,255,966 B2
(45) Date of Patent: Feb. 22, 2022

(54) CYLINDER STROKE DETERMINATION SYSTEM AND METHOD OF DETERMINING A STROKE OF A CYLINDER

(71) Applicant: DEERE & COMPANY, Moline, IL (US)

(72) Inventors: Reynaldo Torres, Guadalupe (MX); Alejandro Vidal, Santa Catarina (MX)

(73) Assignee: DEERE & COMPANY, Moline, IL (US)

( * ) Notice: Subject to any disclaimer, the term of this patent is extended or adjusted under 35 U.S.C. 154(b) by 430 days.

(21) Appl. No.: 16/533,462

(22) Filed: Aug. 6, 2019

(65) Prior Publication Data

US 2021/0041559 A1 Feb. 11, 2021

(51) Int. Cl.
| | |
|---|---|
| *G01S 17/08* | (2006.01) |
| *F16J 7/00* | (2006.01) |
| *F02B 77/08* | (2006.01) |
| *F15B 15/28* | (2006.01) |

(52) U.S. Cl.
CPC .............. *G01S 17/08* (2013.01); *F02B 77/08* (2013.01); *F15B 15/28* (2013.01); *F16J 7/00* (2013.01)

(58) Field of Classification Search
CPC .. G01S 17/08; F02B 77/08; F16J 7/00; G01B 11/18; G01B 11/14; G02B 6/04; F15B 15/28; F15B 13/16
See application file for complete search history.

(56) References Cited

U.S. PATENT DOCUMENTS

| | | | | |
|---|---|---|---|---|
| 4,794,785 | A * | 1/1989 | Cohrs | G01F 25/0015 |
| | | | | 73/1.21 |
| 5,662,021 | A * | 9/1997 | Farmer | B23Q 5/26 |
| | | | | 91/361 |
| 9,593,942 | B2 | 3/2017 | Friend et al. | |
| 2009/0278641 | A1 | 11/2009 | Hedayat | |
| 2013/0263733 | A1 * | 10/2013 | Machijima | F15B 15/2815 |
| | | | | 92/5 R |

FOREIGN PATENT DOCUMENTS

| | | |
|---|---|---|
| DE | 10330914 A1 | 1/2005 |
| DE | 102007028827 A1 | 2/2009 |

OTHER PUBLICATIONS

German Search Report issued in counterpart application No. 102020209597.3 dated Mar. 9, 2021 (10 pages).

* cited by examiner

*Primary Examiner* — Syed O Hasan

(57) ABSTRACT

A cylinder stroke determination system and a method of determining a stroke of a cylinder are provided. The system includes a cylinder having a rod and a barrel, a sensing cylinder configured to operate with the cylinder, and a processor. The sensing cylinder includes a sensing cylinder base coupled to the barrel of the cylinder, a sensing cylinder rod coupled to the connecting portion of the rod of the cylinder, a photon emitter coupled to the sensing cylinder base and configured to emit a photon toward a photon target disposed at the sensing cylinder rod, and a photon receiver coupled to the sensing cylinder base and configured to receive the photon reflected from the photon target. The processor is configured to determine a stroke of the cylinder based on a time of flight of the photon from the photon emitter to the photon receiver.

15 Claims, 5 Drawing Sheets

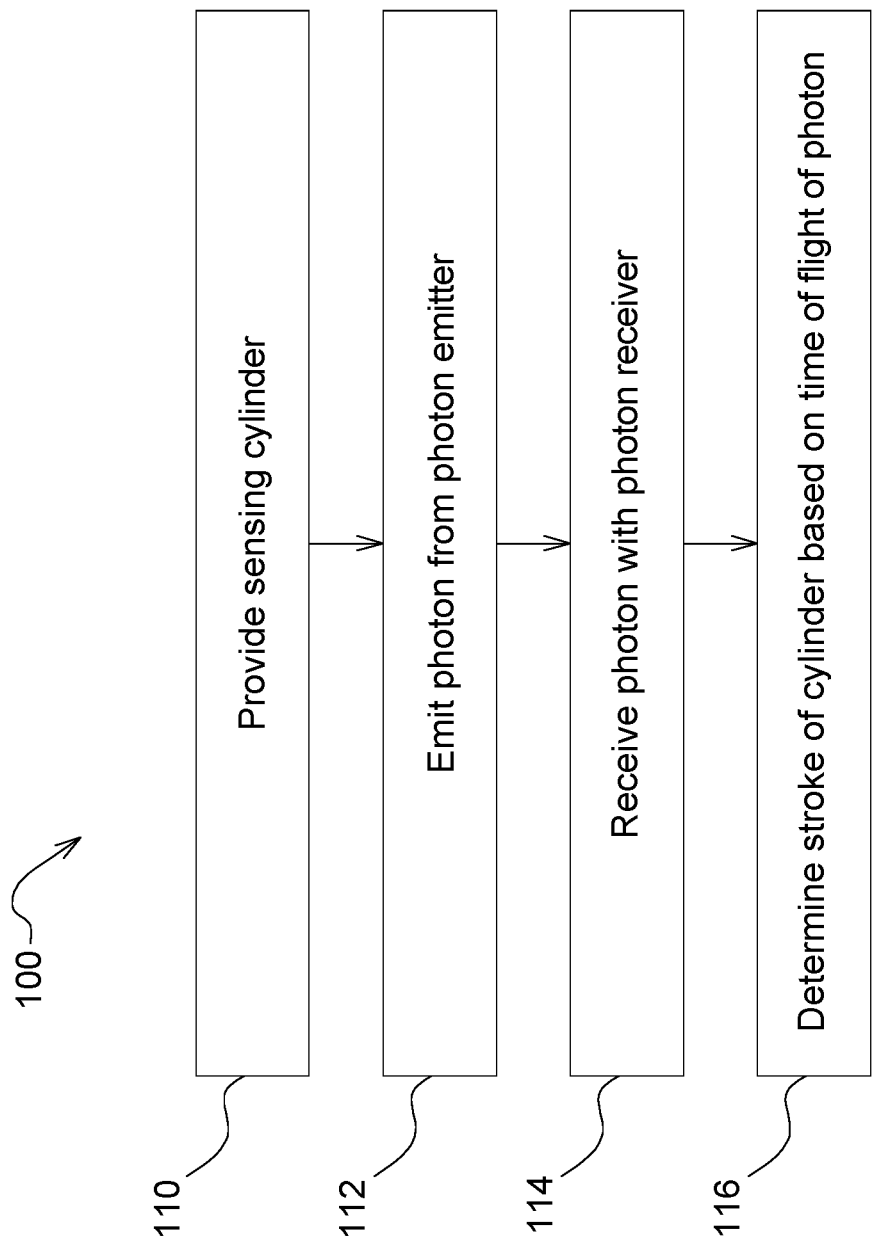

CYLINDER STROKE DETERMINATION SYSTEM AND METHOD OF DETERMINING A STROKE OF A CYLINDER

BACKGROUND

Cylinder position or stroke sensing or determining devices and systems are known using various technologies. For example, an integrated sensor, such as a magnetostrictive type sensor, may be attached to an end of a cylinder and inserted into a bore in the rod. Another conventional system includes a bar-code placed on the outer surface of the rod, and the position is determined with an appropriate bar code reader. It is also known to machine grooves into the outer surface of a cylinder rod and count the number of grooves passing over a sensor to determine position. This method can determine travel, but not absolute position, such as in the event of cylinder drift in a non-powered state. Further, some cylinder position sensing devices of small cylinder/stroke examples may include a linear Hall Effect sensor with a strong magnet.

SUMMARY

Various aspects of examples of the present disclosure are set out in the claims.

In accordance with an embodiment of the present disclosure, a cylinder stroke determination system is provided. The system includes a cylinder having a rod and a barrel, the rod having a stroke portion and a connecting portion, the rod being axially moveable within the barrel along the stroke portion. The system further including a sensing cylinder configured to operate with the cylinder. The sensing cylinder including a sensing cylinder base coupled to the barrel of the cylinder, a sensing cylinder rod coupled to the connecting portion of the rod of the cylinder, a photon emitter coupled to the sensing cylinder base and configured to emit a photon toward a photon target disposed at the sensing cylinder rod, and a photon receiver coupled to the sensing cylinder base and configured to receive the photon reflected from the photon target. The system further includes a processor configured to determine a stroke of the cylinder based on a time of flight of the photon from the photon emitter to the photon receiver.

In accordance with an embodiment of the present disclosure, a method of determining a stroke of a cylinder is provided. The method includes providing a sensing cylinder configured to operate with the cylinder. The sensing cylinder having a sensing cylinder base configured for mounting on a barrel of the cylinder and a sensing cylinder rod configured for mounting on a rod of the cylinder. The method further including emitting a photon from a photon emitter coupled to the sensing cylinder base toward a photon target disposed at the sensing cylinder rod, receiving the photon with a photon receiver coupled to the sensing cylinder base from the photon target, and determining the stroke of the cylinder based on a time of flight of the photon from the photon emitter to the photon receiver.

The above and other features will become apparent from the following description and accompanying drawings.

BRIEF DESCRIPTION OF THE DRAWINGS

The detailed description of the drawings refers to the accompanying figures in which:

FIG. 5 illustrates a method of determining a stroke of a cylinder in accordance with an embodiment of the present disclosure.

Like reference numerals are used to indicate like elements throughout the several figures.

DETAILED DESCRIPTION

At least one example embodiment of the subject matter of this disclosure is understood by referring to FIGS. 1 through 5 of the drawings.

Figure 1:
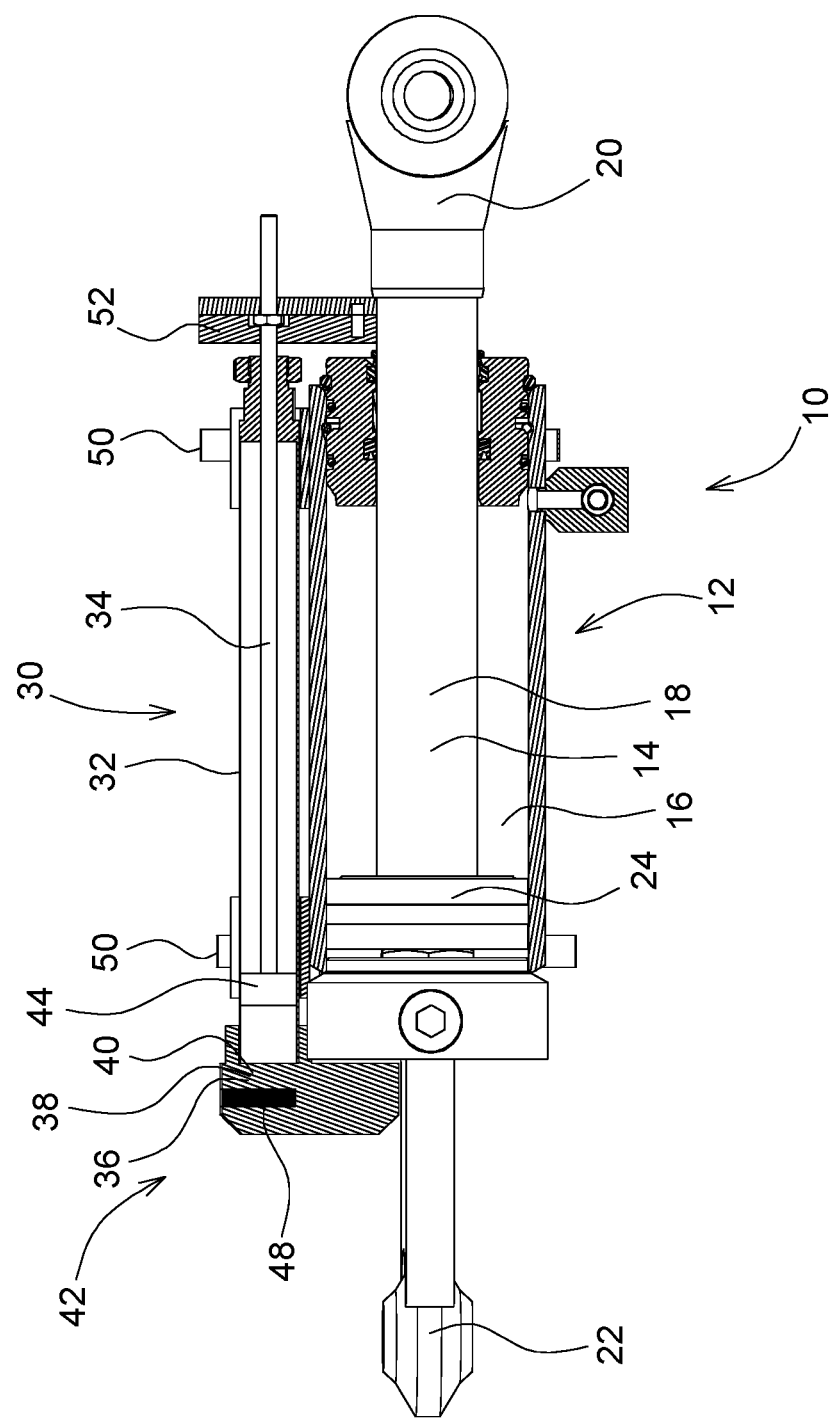
FIG. 1 illustrates a cylinder stroke determination system in accordance with an embodiment of the present disclosure.

Referring now to FIG. 1, a cylinder stroke determination system 10 is illustrated in accordance with an embodiment of the present disclosure. The system 10 includes a cylinder 12 having, generally, a rod 14 and a barrel 16. The cylinder 12 of the illustrated embodiment is a hydraulic cylinder, but the cylinder 12 may include a pneumatic cylinder or another type of power cylinder or may operate in reverse to pump or move fluid according to input at the rod 14 or other portion of the cylinder 12 in embodiments not illustrated. The rod 14 of the cylinder 12 of the illustrated embodiment includes a stroke portion 18 and a connecting portion 20. The rod 14 is axially moveable relative to the barrel 16 within the barrel 16 along the stroke portion 18. In other words, the stroke portion 18 of the rod 14 is configured to move into the barrel 16 while the connecting portion 20 remains outside of the barrel 16 during operation of the cylinder 12. A piston 24 is disposed on the rod 14 to move axially with the rod 14. The cylinder 12 of the illustrated embodiment may be utilized by supplying high pressure fluid, such as hydraulic fluid, to one side of the piston 24 inside the barrel 16 to move a boom, a work tool, or another structure (not illustrated) connected to the connecting portion 20 of the rod 14 or a cylinder connector 22 of the cylinder 12. As used herein, the term "stroke" generally refers to the position of the rod 14 relative to the barrel 16 of the cylinder 12 at a particular point in time but may refer to the overall travel limits of the rod 14 of the cylinder 12 based on the context of usage of the term herein.

Figure 2:
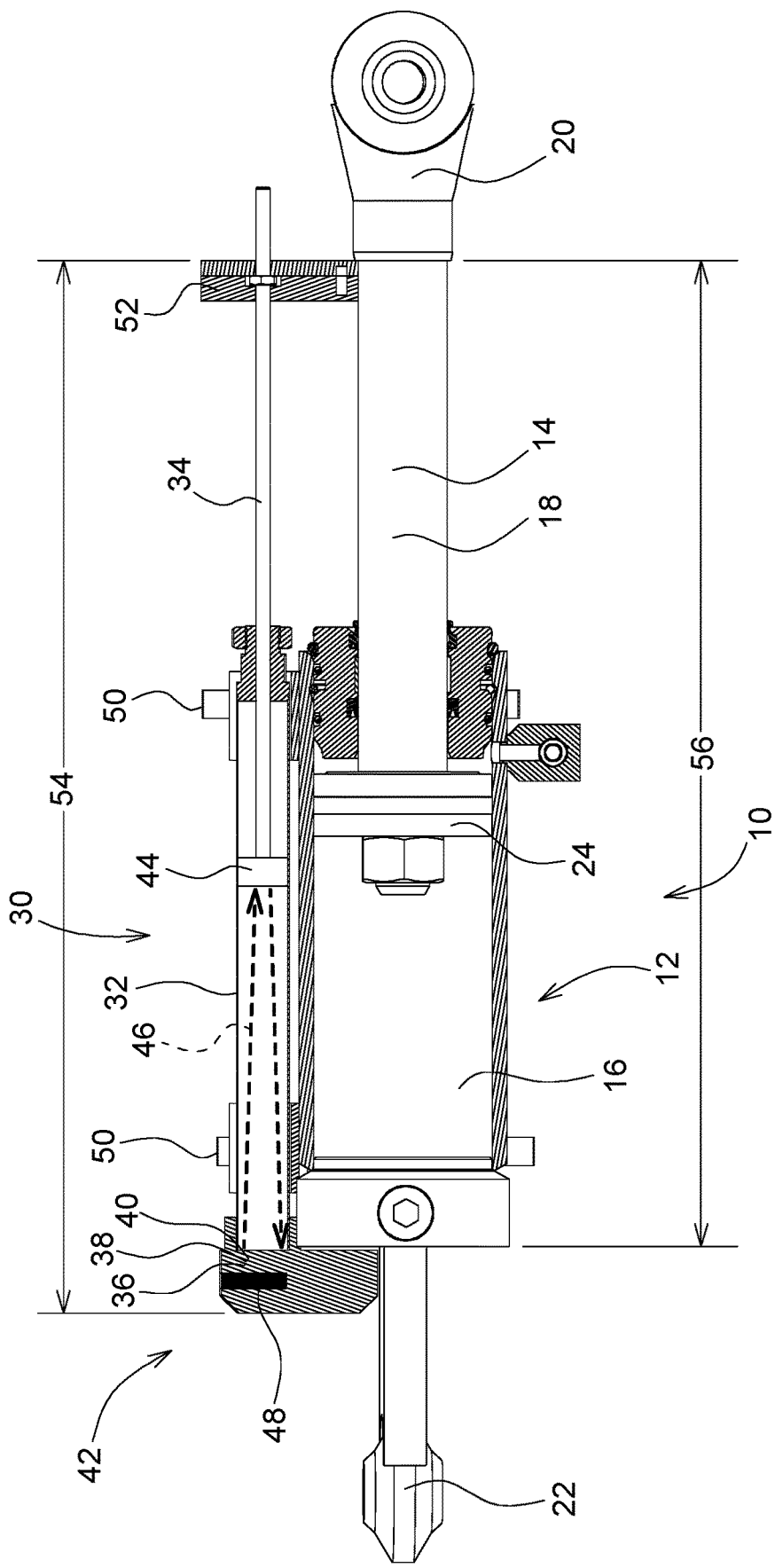
FIG. 2 illustrates a cylinder stroke determination system in accordance with an embodiment of the present disclosure.
Figure 3:
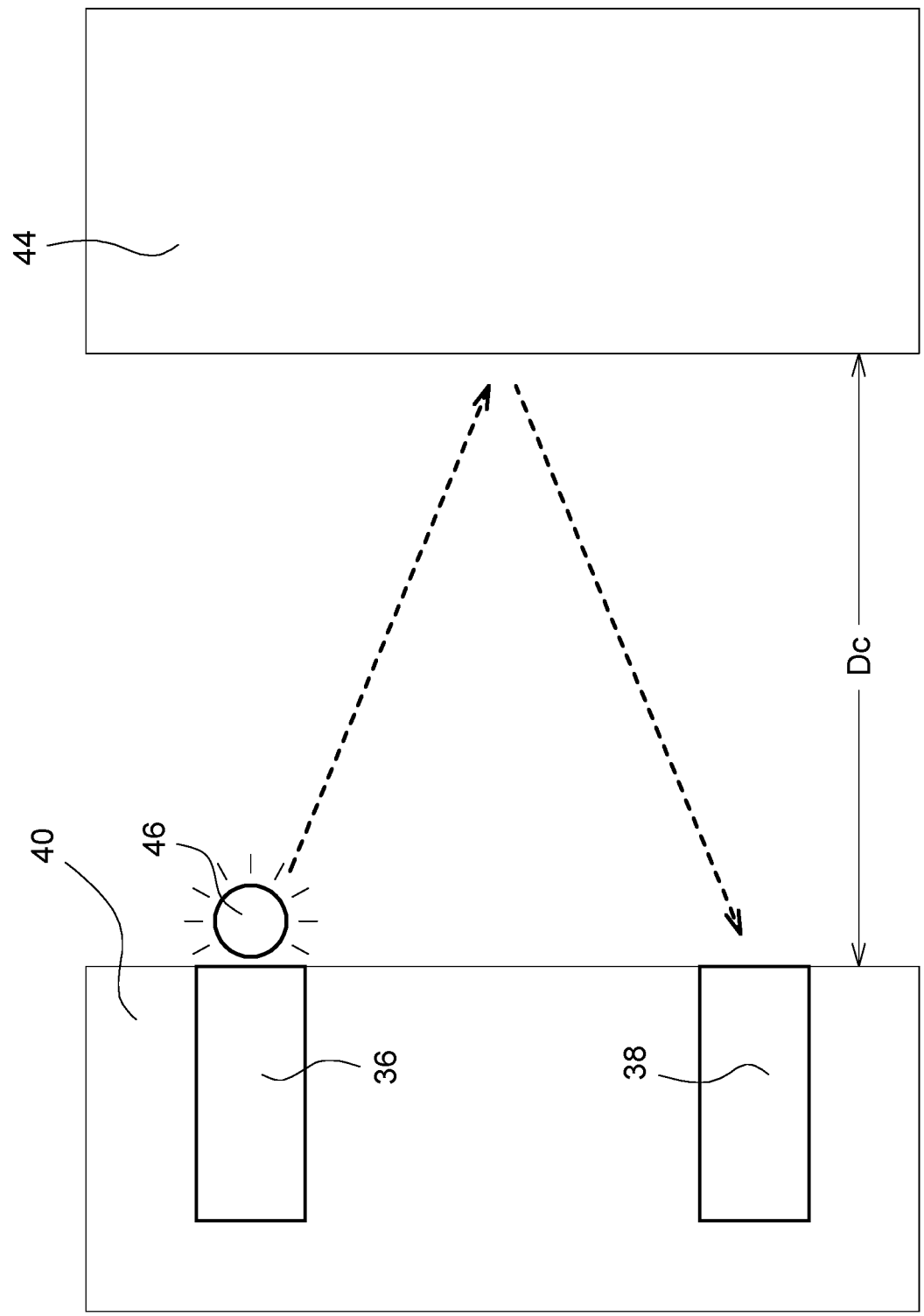
FIG. 3 illustrates a cylinder stroke determination system in accordance with an embodiment of the present disclosure.

Referring now to FIGS. 2 and 3 with continuing reference to FIG. 1, the system 10 includes a sensing cylinder 30 configured to operate with the cylinder 12. The sensing cylinder 30 is mounted outside of the cylinder 12 via one or more coupling member(s) 50 in the illustrated embodiment. In one or more embodiments not illustrated, the sensing cylinder 30 is coupled or connected to the cylinder 12 by other means or integrally formed with the cylinder 12. The sensing cylinder 30 includes a sensing cylinder base 32 coupled to, formed with, or otherwise connected to the barrel 16 of the cylinder 12. The sensing cylinder 30 further includes a sensing cylinder rod 34 coupled to, formed with, or otherwise connected to the connecting portion 20 of the rod 14 of the cylinder 12 such that the sensing cylinder rod 34 moves axially with or follows the stroke or positioning of the rod 14. A rod coupling member 52 is provided in the illustrated embodiment to couple the rod 14 to the sensing cylinder rod 34. The rod 14 of the cylinder 12 and the sensing cylinder rod 34 of the sensing cylinder 30 are parallel in the illustrated embodiment. In further embodiments not illustrated, the rod 14 of the cylinder 12 and the sensing cylinder rod 34 of the sensing cylinder 30 are not parallel. In the embodiment illustrated in FIG. 2, a sensing cylinder length 54 of the sensing cylinder 30 equal to or greater than a cylinder length 56 of the barrel 16 and the stroke portion 18 of the rod 14 of the cylinder 12.

Figure 4:
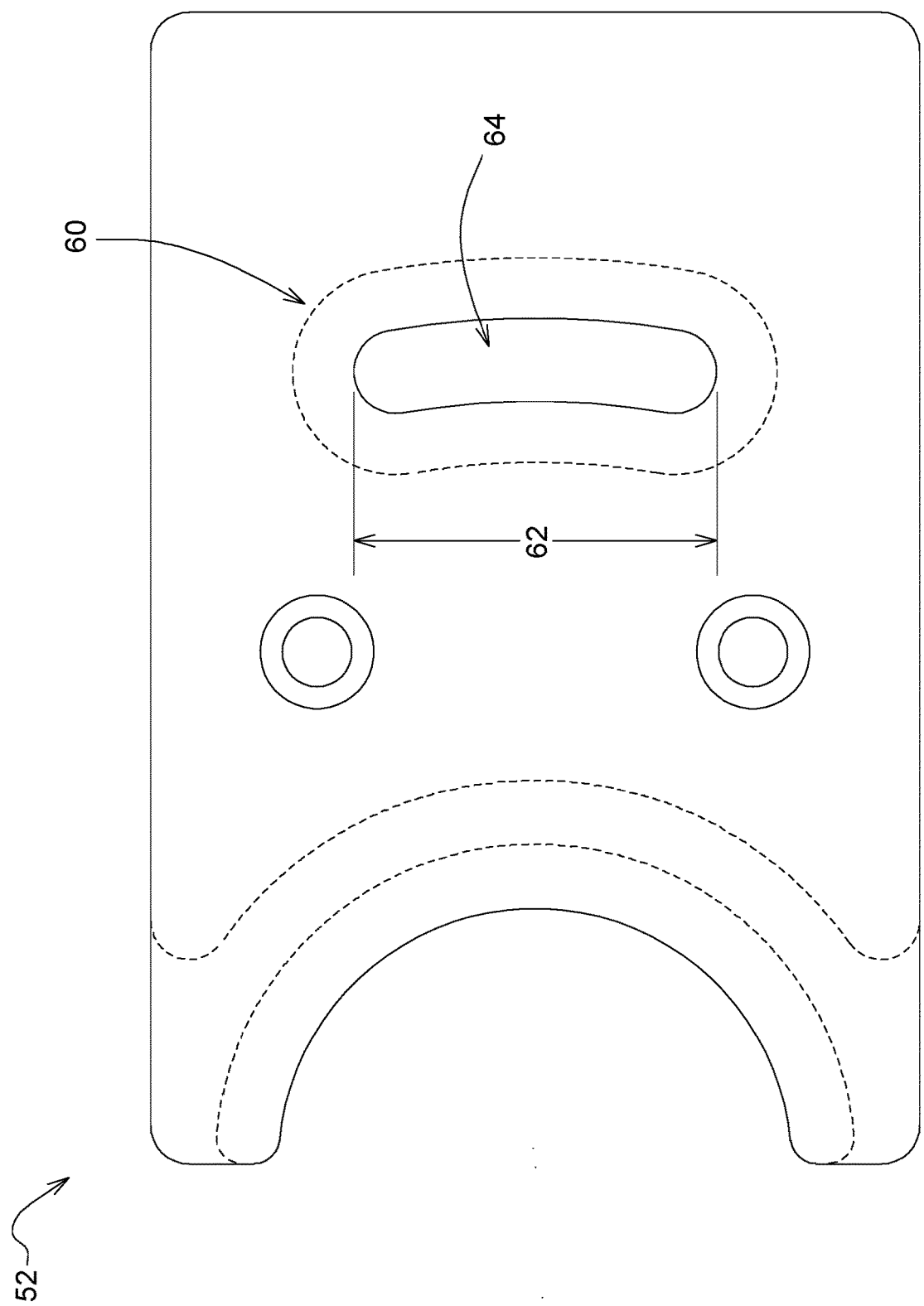
FIG. 4 illustrates a rod coupling member for a cylinder stroke determination system in accordance with an embodiment of the present disclosure.

Referring now to FIG. 4, the rod coupling member 52 of the system 10 of an embodiment includes a rotation accommodation member 60. The rotation accommodation member 60 is configured to maintain the stroke of the sensing cylinder 30 upon rotation of the rod 14 of the cylinder 12. The rotation accommodation member 60 includes a curved, bowed, or arched slot 64 in the illustrated embodiment. The slot 64 of the illustrated embodiment is configured to receive the sensing cylinder rod 34, shown in FIGS. 1 and 2. The slot 64 has a radial length 62 that corresponds to an upper limit degree of rotation of the cylinder 12, but the rotation accommodation member 60 may include another structure or operation to allow the sensing cylinder 30 to accommodate rotation of the cylinder 12 while maintaining, or minimizing a change in, the stroke of the sensing cylinder 30. Although not illustrated, a strap or other fastening device couples the rod coupling member 52 to the rod 14 of the cylinder 12.

The sensing cylinder 30 of the system 10 further includes a photon emitter 36 and a photon receiver 38 coupled to the sensing cylinder base 32. In the illustrated embodiment, the photon emitter 36 and the photon receiver 38 are disposed on an integrated circuit 40 at a sensor end 42 of the sensing cylinder base 32 and are aligned with and face the sensing cylinder rod 34. The sensing cylinder rod 34 includes a photon target 44 sized, positioned, and/or configured to reflect one or more photons, light pulses, or other light signals (individually or collectively referred to as a "photon 46" herein and shown schematically in FIGS. 2 and 3) from the photon emitter 36 to the photon receiver 38. The photon emitter 36 is configured to emit the photon 46 toward the photon target 44 disposed at the sensing cylinder rod 34. The photon receiver 38 is configured to receive the photon 46 reflected from the photon target 44.

With reference to FIGS. 2 and 3, the sensing cylinder 30 of the system 10 further includes a processor 48 configured to determine the stroke of the cylinder 12 based on a time of flight of the photon 46 from the photon emitter 36 to the photon receiver 38. In the illustrated embodiment, the processer 48 determines a time of flight of the photon 46 by determining the amount of time that lapses between emission of the photon 46 by the photon emitter 36 and receipt of the photon 46 by the photon receiver 38. The processor 48 of the illustrated embodiment multiplies the time of flight $T_F$ of the photon 46 by the speed of light c and divides the value by two in order to determine the distance $D_c$ between the integrated circuit 40 at the sensing cylinder base 30 and the photon target 44, in accordance with the following formula:

$$D_c = (T_F \cdot c)/2.$$

The distance $D_c$ measured for the sensing cylinder 30 is equal to, correlates with, or otherwise corresponds to the stroke of the cylinder 12 such that the processor 48 is configured to determine the stroke of the cylinder 12 based on the distance $D_c$. The sensing cylinder 30 of the illustrated embodiment is cylindrical and includes the sensing cylinder rod 34 and the photon target 44 disposed at least partially therein to protect the sensing environment from debris or other materials that may interfere with the operation of the photon emitter 36, the photon receiver 38, or the integrated circuit 40. In additional embodiments not illustrated, the sensing cylinder 30 may not be cylindrical and/or the sensing cylinder rod 34 or the photon target 44 may include a structure not surrounded by the sensing cylinder base 32, but merely connected to the rod 14 to allow the photon emitter 36 and photon receiver 38 to emit/receive the photon 46 in an open-air environment to determine a distance between the integrated circuit 40 and the photon target 44.

Referring now to FIG. 5, a method 100 of determining the stroke of the cylinder 12 is provided in accordance with an embodiment of the present disclosure. The method 100 includes providing, at step 110, the sensing cylinder 30 configured to operate with the cylinder 12, emitting, at step 112, the photon 46 from the photon emitter 36 coupled to the sensing cylinder base 32 toward the photon target 44 disposed at the sensing cylinder rod 34, and receiving, at step 114, the photon 46 with the photon receiver 38 coupled to the sensing cylinder base 32 from the photon target 44. The method 100 further includes determining, at step 116, the stroke of the cylinder 12 based on a time of flight of the photon 46 from the photon emitter 36 to the photon receiver 38.

The method 100 of additional embodiments further includes accommodating rotation of the rod 14 of the cylinder 12 with the rotation accommodation member 60 to maintain a stroke of the sensing cylinder 30 upon rotation of the rod 14 of the cylinder 12. The method 100 of additional embodiment further includes positioning the sensing cylinder rod 34 in the slot 64 of the rotation accommodation member 60 to maintain a stroke of the sensing cylinder 30 upon rotation of the rod 14 of the cylinder 12.

The method 100 of additional embodiments includes mounting the sensing cylinder 30 outside of the cylinder 12 and/or mounting the sensing cylinder 30 such that the rod 14 of the cylinder 12 is parallel to the sensing cylinder rod 34 of the sensing cylinder 30. Determining the stroke of the cylinder 12 in an embodiment of the method 100 includes any steps described in the embodiments herein including being based on a distance $D_c$ between the photon emitter/receiver 36/38 at the sensing cylinder base 32 and the photon target 44. Determining the stroke of the cylinder 12 in a particular embodiment of the method 100 further includes determining the distance $D_c$ between the sensing cylinder base 32 and the photon target 44 based on the time of flight of the photon 46 and the speed of light c. The method 100 of various embodiments may further include any step, structure, and/or feature described in the embodiments of the system 10 herein.

Without in any way limiting the scope, interpretation, or application of the claims appearing below, it will be appreciated that the embodiments of the present disclosure provide a reliable and accurate system and method for determining the stroke of the cylinder 12 without compromising the operation, structure, or materials of the cylinder 12 or larger connected machine. Conventional designs to determine cylinder stroke may be difficult to manufacture, require non-ferrous coatings, machining processes, and/or special sealing performances due to substantial changes to sensitive internal components and/or barrel, rod, or piston modifications. With such conventional designs, any material or structural change should also meet the high strength and load requirements for cylinders, and debris or contaminants in a cylinder or other portion of the system affect accuracy and reliability of conventional designs utilizing a sensor or similar determination system inside of the cylinder 12. The system 10 and the method 100 of the embodiments described herein provides the sensing cylinder 30 external to the cylinder 12 to avoid interference with the operation of the cylinder 12, improve the ease of assembly, service, or repair of the cylinder 12, and improve the ability to retrofit the cylinder 12 with the sensing cylinder 30 in order to immediately determine the stroke of the cylinder 12. Further, the photon emitter/receiver 36/38 operates efficiently and reliably with the photon target 44 to provide a highly accurate distance $D_c$ value with the processor 48 to determine the stroke of the cylinder 12. Even further, the rotation accommodation member 60 of the rod coupling member 52 of an embodiment maintains the stroke of the sensing cylinder 30 upon rotation of the rod 14 of the cylinder 12, minimizes risk of damage to the components of the sensing cylinder 30, and maximizes the sensing accuracy of the sensing cylinder 30.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A cylinder stroke determination system comprising:
   a cylinder comprising a rod and a barrel, the rod comprising a stroke portion and a connecting portion, the rod being axially moveable within the barrel along the stroke portion;
   a sensing cylinder configured to operate with the cylinder, the sensing cylinder comprising
      a sensing cylinder base coupled to the barrel of the cylinder;
      a sensing cylinder rod coupled to the connecting portion of the rod of the cylinder;
      a photon emitter coupled to the sensing cylinder base and configured to emit a photon toward a photon target disposed at the sensing cylinder rod; and
      a photon receiver coupled to the sensing cylinder base and configured to receive the photon reflected from the photon target; and
   a processor configured to determine a stroke of the cylinder based on a time of flight of the photon from the photon emitter to the photon receiver.

2. The system of claim 1, wherein the sensing cylinder is mounted outside of the cylinder.

3. The system of claim 1, wherein the processor is configured to determine the stroke of the cylinder based on a distance between the sensing cylinder base and the photon target.

4. The system of claim 3, wherein the processor is configured to determine the stroke by determining the distance between the sensing cylinder base and the photon target based on the time of flight of the photon and the speed of light.

5. The system of claim 1, wherein the rod of the cylinder and the sensing cylinder rod of the sensing cylinder are parallel.

6. The system of claim 1, wherein the rod of the cylinder is fixed at the connecting portion to the sensing cylinder rod of the sensing cylinder.

7. The system of claim 1, further comprising a rod coupling member configured to couple the rod of the cylinder to the sensing cylinder rod, the rod coupling member comprising a rotation accommodation member configured to maintain a stroke of the sensing cylinder upon rotation of the rod of the cylinder.

8. The system of claim 7, wherein the rotation accommodation member comprises a slot receiving the sensing cylinder rod and being configured to accommodate rotation of the rod of the cylinder.

9. A method of determining a stroke of a cylinder, the method comprising:
   providing a sensing cylinder configured to operate with the cylinder, the sensing cylinder comprising a sensing cylinder base configured for mounting on a barrel of the cylinder and a sensing cylinder rod configured for mounting on a rod of the cylinder;
   emitting a photon from a photon emitter coupled to the sensing cylinder base toward a photon target disposed at the sensing cylinder rod;
   receiving the photon with a photon receiver coupled to the sensing cylinder base from the photon target; and
   determining the stroke of the cylinder based on a time of flight of the photon from the photon emitter to the photon receiver.

10. The method of claim 9, further comprising mounting the sensing cylinder outside of the cylinder.

11. The method of claim 10, further comprising mounting the sensing cylinder such that the rod of the cylinder is parallel to the sensing cylinder rod of the sensing cylinder.

12. The method of claim 9, wherein determining the stroke of the cylinder is based on a distance between the sensing cylinder base and the photon target.

13. The method of claim 12, wherein determining the stroke comprises determining the distance between the sensing cylinder base and the photon target based on the time of flight of the photon and the speed of light.

14. The method of claim 9, further comprising accommodating rotation of the rod of the cylinder with a rotation accommodation member to maintain a stroke of the sensing cylinder upon rotation of the rod of the cylinder.

15. The method of claim 14, further comprising positioning the sensing cylinder rod in a slot of the rotation accommodation member to maintain a stroke of the sensing cylinder upon rotation of the rod of the cylinder.

* * * * *